June 1, 1943.  J. C. McCARTNEY ET AL  2,320,976
CLEANING DEVICE FOR MIXING OR AGITATING VESSELS
Filed Dec. 12, 1940
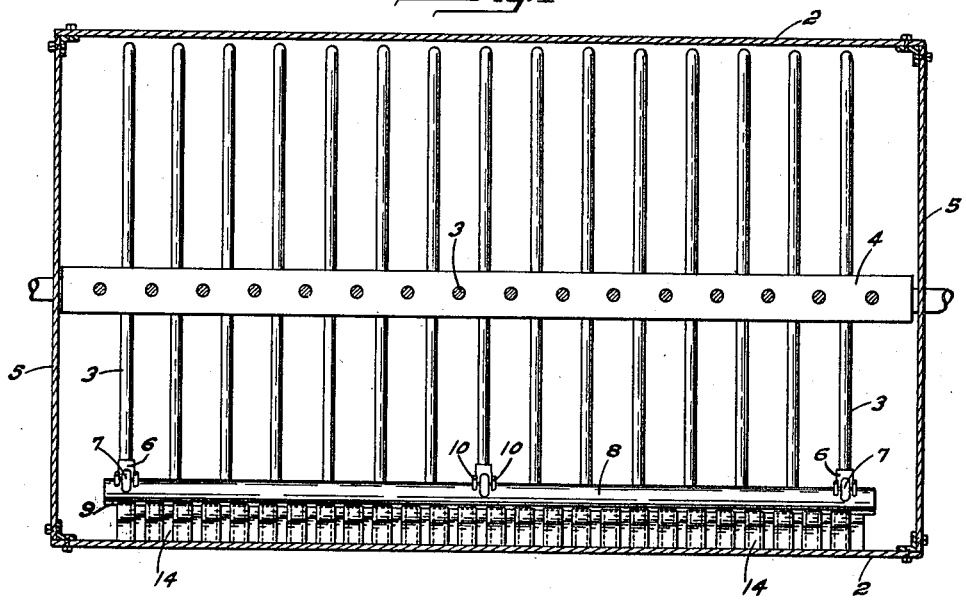
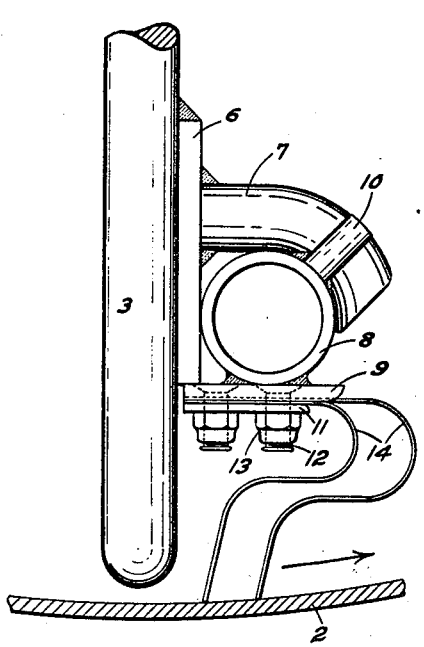
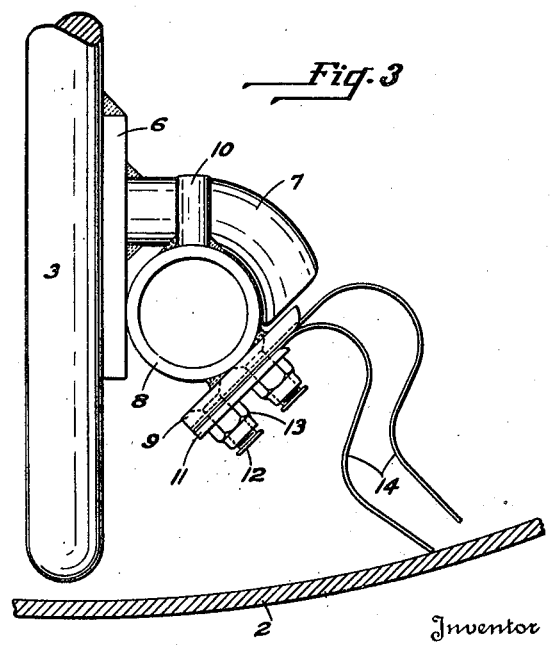

Patented June 1, 1943

2,320,976

UNITED STATES PATENT OFFICE 2,320,976

CLEANING DEVICE FOR MIXING OR AGITATING VESSELS

John C. McCartney, Lancaster, and Harry R. Jaynes, Manheim Township, Lancaster County, Pa., assignors to Armstrong Cork Company, Lancaster, Pa., a corporation of Pennsylvania Application December 12, 1940, Serial No. 369,788

8 Claims. (Cl. 259—109)

This invention relates to cleaning devices for mixing or agitating vessels and, more particularly, to scraping devices for removing a layer or "skin" of hardened or oxidized siccative oil from the walls of so-called mechanical oxidizing kettles used in the linoleum industry.

The chief object of our invention is to provide a device which may be easily and quickly disposed in mixing or agitating vessels and which speedily and efficiently cleans the wall of such vessels. An object is to provide a scraping device for ready attachment to the agitators of mixing vessels which quickly and easily scrapes encrusted material from the walls of such vessels. A further object is to provide an economical scraping device having flexible scraping blades adapted to be held in flexed condition or under compression by the walls of the mixing vessel thereby retaining the device in desired position to efficiently and satisfactorily scrape the walls. Other objects of our invention will be readily perceived from the following description.

This invention relates to a scraping device for cleaning the wall of a generally cylindrical mixing or agitating vessel having rotatable agitators comprising in combination arms mounted on the agitators, a body member disposed adjacent said arms and held against inward movement by said arms, and flexible means mounted on said member for cleaning the wall of the vessel, said means being held in compressed or flexed condition by the wall of the vessel, attempted expansion of said means serving to hold said member in position adjacent said arms.

This invention further relates to a scraping device for attachment to agitators of a generally cylindrical mixing or agitating vessel comprising in combination a body member adapted to engage the agitators and to be rotatable therewith and means mounted on the body member for scraping the cylindrical wall of the vessel.

The attached drawing illustrates a preferred embodiment of our invention, in which Figure 1 is a sectional view through a mixing or agitating vessel illustrating our scraping device in position to clean the wall of the vessel;

Figure 2 is a view in end elevation of our scraping device disposed in cleaning position within the vessel; and Figure 3 is a view in end elevation similar to Figure 2, serving to illustrate the manner in which our device is placed in cleaning position.

Referring to the drawing, there is shown a generally cylindrical mixing or agitating vessel having a side wall 2 of curved or arcuate contour and provided with agitators 3 mounted on a centrally disposed bar or shaft 4 journalled in the end walls 5 of the vessel. Any suitable means may be provided to rotate the shaft 4 carrying with it the agitators 3 to beat, mix or agitate the material being prepared. Small plates 6 are secured, preferably by welding, to certain agitators 3 disposed lengthwise of the vessel and serve to hold arms or lugs 7 welded thereto. It will be understood, of course, the plates 6 and arms 7 may be formed as an integral unit in any desired manner. Preferably, the arm or lug 7 extends outwardly and downwardly from the plate 6 to form a recess therebetween in which the body member of the scraping device may rest.

The body member of the scraping device preferably comprises a cylindrical tube or shaft 8 of substantially the same diameter as the width of the recess so as to fit therein, and a base plate 9 welded thereto. The base plate 9 is provided with a plurality of recesses spaced longitudinally thereof for a purpose hereinafter described. Welded to the tube 8 are spaced pins 10 adapted to fit on opposite sides of each arm 7 so as to prevent longitudinal movement of the tube when it is fitted in the recess. A plurality of clamp members or plates 11 are provided secured by bolts 12 to the plate 9. Suitable nuts 13 are placed on the bolts 12 and the ends of the bolts peened to prevent removal. The plates 11 may be tightly clamped to the plate 9 or loosely secured thereto by merely tightening or loosening the nuts 13. A plurality of flexible blades 14 of harrow-like configuration are clamped between the plate 9 and the clamp members 11 in overlapping, staggered or offset position, alternate blades 14 fitting in and being clamped in the recesses in the plate. The blades 14 are staggered in order to ensure thorough cleaning if the wall be undulating or of irregular configuration. The blades 14 are slotted at one end so that they may fit about the bolts 12 and are clamped securely in proper position by tightening the nuts 13 thus forcing the clamp members 11 toward the plate 9 and securely holding the blades therebetween. By so securing the blades in proper position any worn blade may be quickly and easily replaced without disturbing the adjustment of the remaining blades.

In assembling the device, the body member carrying the blades 14 is placed on the bottom of the mixing or agitating vessel and a suitable tool is placed about the tube 8; the tube 8 is raised and is fitted within the recesses formed by the arms 7 and the plates 6. It will be noted that further upward or inward movement of the tube 8 is prevented by the arms 7 while outward movement thereof is prevented by the downwardly extending portions of the arms. The pins 10 fit on opposite sides of the arms 7 to prevent longitudinal movement of the tube 8. At this time, the blades 14 are in substantially uncompressed condition and the device is in the position shown in Figure 3. By means of the tool, the tube 8 is rotated in a clockwise direction until the plate 9 strikes the plates 6 which serve as stops to prevent further rotation. By such rotation, the blades 14 are snapped into engagement with the wall 2 of the vessel and are held under compression or in flexed condition thereby. The device is then in the position shown in Figure 2 and may be rotated in the direction of the arrow to scrape the wall 2. The blades 14, as pointed out above, are held under compression or in flexed condition by the wall 2 of the vessel. Attempted expansion of the blades 14 securely holds the tube 8 within the recesses formed by the arms 7 and the plates 6 when the device is in operation.

In operation, any suitable means may be used to rotate the shaft 4 which supports the agitators 3. Rotation of the agitators 3 causes rotation of the cleaning or scraping device secured thereto. The blades 14 being held under compression by the wall 2 are in secure engagement therewith and thus securely scrape or clean the wall 2 as the device is rotated about the shaft 4.

While we have described our invention in connection with mixing or agitating vessels in which the agitators of the vessel are rotatable, it will be understood our invention is likewise applicable with similar vessels in which the agitators remain stationary and the walls of the vessel rotate.

Our invention provides an economical and ready means for cleaning or scaping the walls of agitating or mixing vessels. Our scraping device is quickly and easily placed in position to clean the wall of the vessel. It may be quickly and easily assembled or disassembled from the agitators of the mixing vessel and is economical in original cost and in operation.

While we have described and illustrated a preferred embodiment of our invention, it will be understood our invention is not so limited since it may be otherwise embodied within the scope of the following claims.

We claim:

1. In a scraping device for attachment to agitators of a generally cylindrical mixing or agitating vessel, the combination of a cylindrical tube adapted to engage arms disposed on the agitators, spaced pins on said tube adapted to be disposed adjacent the arms of the agitators to prevent substantial longitudinal movement of said tube, a plate integrally united with said tube, clamp members secured to said plate, and a plurality of staggered, overlapping flexible blades securely held between said plate and said clamp members adapted to scrape the wall of the vessel, said blades being adapted to be held in flexed condition by the wall, attempted expansion of said blades holding said tube in engagement with the agitator arms.

2. In a scraping device for cleaning the wall of a generally cylindrical mixing or agitating vessel having rotatable agitators, the combination of curved arms mounted on the agitators, a cylindrical tube fitted within said arms, a plate integrally united with said tube, spaced pins on said tube disposed adjacent the arms to prevent substantial longitudinal movement of the tube, clamp members secured to said plate, and a plurality of staggered, overlapping flexible blades of harrow-like configuration clamped between said members and said plate, said blades being held in flexed condition by the wall of the vessel, attempted expansion of said blades holding the tube in position within said arms.

3. In a scraping device for cleaning the wall of a generally cylindrical mixing or agitating vessel having rotatable agitators, the combination of arms mounted on the agitators, a body member fitted within said arms, spaced pins on said member disposed adjacent the arms to prevent substantial longitudinal movement of said member, a plurality of plates secured to said member, and a plurality of flexible blades clamped between said plates and said member, said blades being held in flexed condition by the wall of the vessel.

4. In a scraping device for attachment to agitators of a generally cylindrical mixing or agitating vessel, the combination of curved arms disposed on the agitators, a body member adapted to fit within said curved arms, and flexible means mounted on said body member for scraping the cylindrical wall of the vessel, said means being adapted to be held in flexed condition by the wall, attempted expansion of said means holding said body member against the curved arms disposed on the agitators thus maintaining it in position in the vessel.

5. In a scraping device for attachment to agitators of a generally cylindrical mixing or agitating vessel, the combination of a body member adapted to engage arms disposed on the agitators, spaced pins on said member adapted to be disposed on opposite sides of the arms of the agitators to prevent substantial longitudinal movement of said member, and a plurality of staggered, overlapping, flexible scraping blades mounted on said member and adapted to be flexed by the wall of the vessel to urge said member against said arms thus maintaining said member in position in the vessel.

6. In a scraping device for cleaning the wall of a generally cylindrical mixing or agitating vessel having rotatable agitators, the combination of arms mounted on the agitators, a body member disposed adjacent said arms and held against inward movement by said arms, spaced pins on said member disposed on opposite sides of said arms to prevent substantial longitudinal movement of said member, and a plurality of staggered, overlapping flexible blades mounted on said member and flexed by the wall of the vessel to urge the body member against said arms thus maintaining the body member in position in the vessel.

7. In a scraping device for attachment to agitators of a generally cylindrical mixing or agitating vessel, the combination of a body member adapted to engage arms disposed on the agitators, clamp members secured to said body member, and rows of flexible blades staggered in respect to each other clamped between said clamp members and said body member adapted to scrape the wall of the vessel, said blades being adapted to be flexed by the wall to urge said body member against said arms thus maintaining it in position in the vessel.

8. In a scraping device for attachment to agitators of a generally cylindrical mixing or agitating vessel, the combination of a body member adapted to engage arms disposed on the agitators, a plate integrally united with said body member, clamp members secured to said plate and rows of flexible blades staggered in respect to each other securely held between said plate and said clamp members adapted to scrape the wall of the vessel, said blades being adapted to be flexed by the wall to urge said body member against said arms thus maintaining it in position in the vessel.

JOHN C. McCARTNEY.
HARRY R. JAYNES.